United States Patent
Fattal et al.

(10) Patent No.: US 12,196,983 B2
(45) Date of Patent: Jan. 14, 2025

(54) MULTIVIEW DISPLAY AND METHOD HAVING LIGHT CONTROL FILM

(71) Applicant: LEIA INC., Menlo Park, CA (US)

(72) Inventors: David A. Fattal, Menlo Park, CA (US); Ming Ma, Menlo Park, CA (US)

(73) Assignee: LEIA Inc., Menlo Park, CA (US)

( * ) Notice: Subject to any disclaimer, the term of this patent is extended or adjusted under 35 U.S.C. 154(b) by 577 days.

(21) Appl. No.: 17/394,157

(22) Filed: Aug. 4, 2021

(65) Prior Publication Data

US 2021/0364816 A1  Nov. 25, 2021

Related U.S. Application Data

(63) Continuation of application No. PCT/US2019/066630, filed on Dec. 16, 2019.
(Continued)

(51) Int. Cl.
*G02B 30/33* (2020.01)
*G02B 5/18* (2006.01)
(Continued)

(52) U.S. Cl.
CPC ........... *G02B 30/33* (2020.01); *G02B 5/1819* (2013.01); *G02B 27/4272* (2013.01);
(Continued)

(58) Field of Classification Search
CPC ...... H04N 13/349; H04N 13/32; G02B 30/33; G02B 6/08; G02F 1/29
See application file for complete search history.

(56) References Cited

U.S. PATENT DOCUMENTS

| 5,689,283 A | 11/1997 | Shirochi |
| 7,876,397 B2 | 1/2011 | Krijn et al. |
| (Continued) | | |

FOREIGN PATENT DOCUMENTS

| CA | 3125431 | 8/2020 |
| CA | 3125536 | 8/2020 |
| (Continued) | | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.
(Continued)

*Primary Examiner* — Jessica M Merlin
(74) *Attorney, Agent, or Firm* — Schwegman Lundberg & Woessner, P.A.

(57) ABSTRACT

A multiview display includes an array of light valves having rows of a repeating plurality of color sub-pixels and arranged as a plurality of multiview pixels configured to modulate directional light beams as color pixels of views of a multiview image. A first row of the repeating plurality of color sub-pixels is offset from a second row of the repeating plurality of color sub-pixels in a row direction by an integer multiple of a width of a color sub-pixel. The offset of the first and second rows is configured to provide corresponding color sub-pixels in adjacent multiview pixels having different colors to mitigate color fringing associated with the color pixel of the multiview image. The multiview display further includes a light control film configured to control a view angle of the multiview image.

17 Claims, 6 Drawing Sheets

Related U.S. Application Data

(60) Provisional application No. 62/806,807, filed on Feb. 16, 2019.

(51) Int. Cl.
| | |
|---|---|
| *G02B 27/01* | (2006.01) |
| *G02B 27/42* | (2006.01) |
| *G02B 30/32* | (2020.01) |
| *G02F 1/29* | (2006.01) |
| *H04N 13/312* | (2018.01) |
| *H04N 13/32* | (2018.01) |
| *H04N 13/349* | (2018.01) |

(52) U.S. Cl.
CPC ............ *G02B 30/32* (2020.01); *G02F 1/29* (2013.01); *H04N 13/312* (2018.05); *H04N 13/32* (2018.05); *H04N 13/349* (2018.05); *G02B 27/0101* (2013.01); *G02B 2027/0134* (2013.01); *G02B 2207/123* (2013.01)

(56) References Cited

U.S. PATENT DOCUMENTS

| | | |
|---|---|---|
| 8,506,150 B2 | 8/2013 | Kashiwagi et al. |
| 9,128,226 B2 | 9/2015 | Fattal et al. |
| 9,201,270 B2 | 12/2015 | Fattal et al. |
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 10,345,505 B2 | 7/2019 | Fattal |
| 10,408,992 B2 | 9/2019 | Woodgate et al. |
| 10,551,546 B2 | 2/2020 | Fattal |
| 10,649,128 B2 | 5/2020 | Fattal et al. |
| 10,798,371 B2 | 10/2020 | Fattal |
| 10,802,212 B2 | 10/2020 | Fattal |
| 10,802,443 B2 | 10/2020 | Fattal |
| 10,810,917 B2 | 10/2020 | Fattal |
| 10,830,939 B2 | 11/2020 | Fattal et al. |
| 10,838,134 B2 | 11/2020 | Fattal et al. |
| 10,884,175 B2 | 1/2021 | Fattal |
| 10,901,212 B2 | 1/2021 | Fattal |
| 10,928,564 B2 | 2/2021 | Fattal |
| 10,928,677 B2 | 2/2021 | Aieta et al. |
| 10,969,627 B2 | 4/2021 | Fattal et al. |
| 11,004,407 B2 | 5/2021 | Fattal et al. |
| 11,011,121 B2 | 5/2021 | Fattal et al. |
| 11,016,235 B2 | 5/2021 | Fattal et al. |
| 11,041,988 B2 | 6/2021 | Fattal et al. |
| 11,048,036 B2 | 6/2021 | Ma et al. |
| 11,846,800 B2 * | 12/2023 | Fattal ............... H04N 13/312 |
| 2003/0052836 A1 | 3/2003 | Matsumoto et al. |
| 2005/0248972 A1 | 11/2005 | Kondo et al. |
| 2006/0152435 A1 | 7/2006 | Kondo et al. |
| 2008/0211977 A1 | 9/2008 | Ijzerman et al. |
| 2009/0262420 A1 * | 10/2009 | Yun .................. G02B 30/29 359/625 |
| 2009/0322986 A1 | 12/2009 | Wei et al. |
| 2010/0245406 A1 * | 9/2010 | Redert ............... H04N 13/305 348/E13.001 |
| 2012/0200807 A1 | 8/2012 | Wei et al. |
| 2012/0224389 A1 * | 9/2012 | Kashiwagi ........... G02B 6/0043 362/608 |
| 2013/0057159 A1 | 3/2013 | Pijlman et al. |
| 2013/0169518 A1 | 7/2013 | Wu et al. |
| 2013/0241964 A1 | 9/2013 | Ohyama et al. |
| 2013/0250568 A1 | 9/2013 | Koito et al. |
| 2013/0293851 A1 | 11/2013 | Tsai |
| 2013/0335538 A1 | 12/2013 | Shestak et al. |
| 2014/0063213 A1 | 3/2014 | Tsuchihashi et al. |
| 2015/0036068 A1 | 2/2015 | Fattal et al. |
| 2016/0132025 A1 | 5/2016 | Taff et al. |
| 2016/0219271 A1 | 7/2016 | Wei |
| 2016/0291339 A1 | 10/2016 | Minami |
| 2017/0363794 A1 | 12/2017 | Wan et al. |
| 2018/0188691 A1 | 7/2018 | Fattal |
| 2018/0284341 A1 | 10/2018 | Woodgate et al. |
| 2018/0292647 A1 | 10/2018 | Fattal |
| 2019/0302336 A1 | 10/2019 | Fattal et al. |
| 2020/0033526 A1 | 1/2020 | Fattal et al. |
| 2020/0301165 A1 | 9/2020 | Fattal |
| 2020/0310135 A1 | 10/2020 | Fattal |
| 2020/0409172 A1 | 12/2020 | Fattal |
| 2021/0368158 A1 | 11/2021 | Fattal et al. |

FOREIGN PATENT DOCUMENTS

| | | |
|---|---|---|
| CN | 102298256 | 12/2011 |
| CN | 103389582 | 11/2013 |
| CN | 103403607 | 11/2013 |
| CN | 107144972 | 9/2017 |
| CN | 113498489 | 10/2021 |
| EP | 0606162 | 7/1994 |
| EP | 0791847 | 8/1997 |
| EP | 2682805 | 1/2014 |
| EP | 3924766 | 12/2021 |
| EP | 3924772 | 12/2021 |
| JP | 2004012644 | 1/2004 |
| JP | 2004023203 | 1/2004 |
| JP | 2007507071 | 3/2007 |
| JP | 2007183611 | 7/2007 |
| JP | 2008102430 | 5/2008 |
| JP | 2011002832 | 1/2011 |
| JP | 2012155307 | 8/2012 |
| JP | 2012185275 | 9/2012 |
| JP | 2013105675 | 5/2013 |
| JP | 2013200401 | 10/2013 |
| JP | 2014512560 | 5/2014 |
| JP | 2018072507 | 5/2018 |
| JP | 2022520582 | 3/2022 |
| JP | 2022524582 | 5/2022 |
| JP | 7270050 | 4/2023 |
| JP | 7418454 | 1/2024 |
| KR | 20210107896 | 9/2021 |
| KR | 20210110737 | 9/2021 |
| KR | 102606460 | 11/2023 |
| TW | 201732370 | 9/2017 |
| TW | 202043843 | 12/2020 |
| TW | I735159 | 8/2021 |
| WO | 2012038856 A1 | 3/2012 |
| WO | 2017041079 | 3/2017 |
| WO | 2018186892 | 10/2018 |
| WO | 2018213100 | 11/2018 |
| WO | 2018213101 A1 | 11/2018 |
| WO | 2018236372 | 12/2018 |
| WO | 2020131087 A1 | 6/2020 |
| WO | 2020167373 A1 | 8/2020 |
| WO | 2020167374 | 8/2020 |
| WO | 2020222770 A1 | 11/2020 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

(56) References Cited

OTHER PUBLICATIONS

Son, Jung-Young et al., "Three-Dimensional Imaging Methods Based on Multiview Images," IEEE/OSA Journal of Display Technology, Sep. 2005, pp. 125-140, vol. 1, No. 1.
International Search Report and Written Opinion (ISRWO) by International Searching Authority (ISA) Korean Intellectual Property Office (KIPO) dated Apr. 20, 2020 (13 pages) for foreign counterpart parent PCT Application No. PCT/US2019/066630.
"International Application Serial No. PCT US2019 066630, International Preliminary Report on Patentability mailed Aug. 26, 2021", 8 pgs.
"U.S. Appl. No. 17/392,129, Non Final Office Action mailed Feb. 20, 2024", 18 pgs.
"U.S. Appl. No. 17/392,129, Restriction Requirement mailed Oct. 4, 2023", 6 pgs.
"U.S. Appl. No. 17/392,129, Response filed Dec. 2, 2023 to Restriction Requirement mailed Oct. 4, 2023", 8 pgs.
"International Application Serial No. PCT US2019 066623, International Search Report mailed Apr. 16, 2020", 5 pgs.
"International Application Serial No. PCT US2019 066623, Written Opinion mailed Apr. 16, 2020", 5 pgs.
"European Application Serial No. 19915384.2, Extended European Search Report mailed Oct. 19, 2022", 10 pgs.
"Canadian Application Serial No. 3,125,431, Office Action mailed Sep. 20, 2022", 3 pgs.
"Canadian Application Serial No. 3,125,431, Office Action mailed May 3, 2023", 4 pgs.
"Canadian Application Serial No. 3,125,431, Response filed Jan. 16, 2023 to Office Action mailed Sep. 20, 2022", 9 pgs.
"Canadian Application Serial No. 3,125,431, Response filed Aug. 22, 2023 to Office Action mailed May 3, 2023", 6 pgs.
"European Application Serial No. 19915384.2, Response to Communication pursuant to Rules 161(2) and 162 EPC filed Mar. 16, 2022", 13 pgs.
"European Application Serial No. 19915384.2, Response filed Apr. 18, 2023 to Extended European Search Report mailed Oct. 19, 2022", 15 pgs.
"European Application Serial No. 19915384.2, Intention to Grant mailed Mar. 28, 2024", 6 pgs.
"Japanese Application Serial No. 2021-547486, Notice of Reason for Rejection mailed Nov. 22, 2022", w English translation, 10 pgs.
"Japanese Application Serial No. 2021-547486, Response filed Feb. 22, 2023 to Notice of Reason for Rejection mailed Nov. 22, 2022", w o English, 10 pgs.
"Japanese Application Serial No. 2021-547486, Decision of Rejection mailed Jun. 20, 2023", w English translation, 9 pgs.
"Japanese Application Serial No. 2021-547486, Response filed Oct. 19, 2023 to Decision of Rejection mailed Jun. 20, 2023", w English Translation, 16 pgs.
"Korean Application Serial No. 10-2021-7026488, Notice of Preliminary Rejection mailed Oct. 12, 2023", w English translation, 18 pgs.
"Korean Application Serial No. 10-2021-7026488, Response filed Jan. 12, 2024 to Notice of Preliminary Rejection mailed Oct. 12, 2023", w English Translation, 13 pgs.
"Chinese Application Serial No. 201980092231.0, Office Action mailed Nov. 2, 2022", w English translation, 28 pgs.
"Chinese Application Serial No. 201980092231.0, Response filed Mar. 15, 2023 to Office Action mailed Nov. 2, 2022", 5 pgs.
"European Application Serial No. 19914831.3, Extended European Search Report mailed Nov. 25, 2022", 8 pgs.
"Canadian Application Serial No. 3,125,536, Office Action mailed Sep. 20, 2022", 3 pgs.
"Canadian Application Serial No. 3,125,536, Office Action mailed May 26, 2023", 4 pgs.
"U.S. Appl. No. 17/392,129, Notice of Allowance mailed Jun. 28, 2024", 9 pgs.
"Canadian Application Serial No. 3,125,536, Response filed Jan. 17, 2023 to Office Action mailed Sep. 20, 2022", 9 pgs.
"Canadian Application Serial No. 3,125,536, Response filed Sep. 20, 2023 to Office Action mailed May 26, 2023", 6 pgs.
"Taiwanese Application Serial No. 109104808, Office Action mailed Feb. 21, 2020", W English Translation, 7 pgs.
"Taiwanese Application Serial No. 109104808, Office Action mailed Dec. 18, 2020", W English Translation, 16 pgs.
"Taiwanese Application Serial No. 109104808, Office Action mailed Jun. 1, 2021", W English Translation, 3 pgs.
"Taiwanese Application Serial No. 109104808, Response filed Jun. 2, 2020 to Office Action mailed Feb. 21, 2020", W English translation, 135 pgs.
"Taiwanese Application Serial No. 109104808, Response filed Mar. 11, 2021 to Office Action mailed Dec. 18, 2020", W English translation, 42 pgs.
"U.S. Appl. No. 17/392,129, Response filed May 7, 2024 to Non Final Office Action mailed Feb. 20, 2024", 15 pgs.
"Japanese Application Serial No. 2021-547229, Notification of Reasons for Rejection mailed Sep. 27, 2022", W English Translation, 6 pgs.
"Korean Application Serial No. 10-2021-7027044, Notice of Preliminary Rejection mailed Mar. 8, 2023", W English Translation, 14 pgs.
"Korean Application Serial No. 10-2021-7027044, Response filed Apr. 26, 2023 to Notice of Preliminary Rejection mailed Mar. 8, 2023", W English Claims, 22 pgs.
"European Application Serial No. 19914831.3, Response to Communication pursuant to Rules 161(2) and 162 EPC filed Mar. 31, 2022", 13 pgs.
"European Application Serial No. 19914831.3, Response filed Jun. 5, 2023 to Extended European Search Report mailed Nov. 25, 2022", 16 pgs.
"European Application Serial No. 19914831.3, Intention to Grant mailed May 17, 2024", 6 pgs.
"U.S. Appl. No. 17/392,129, Supplemental Notice of Allowability mailed Jul. 17, 2024", 2 pgs.
"European Application Serial No. 19914831.3, Response filed Jul. 12, 2024 to Intention to Grant mailed May 17, 2024", Text was not approved, amendment submitted, 6 pgs.

\* cited by examiner

MULTIVIEW DISPLAY AND METHOD HAVING LIGHT CONTROL FILM

CROSS-REFERENCE TO RELATED APPLICATIONS

This application is a continuation application of and claims the benefit of priority to International Patent Application No. PCT/US2019/066630, filed on Dec. 16, 2019, which claims priority to U.S. Provisional Application Ser. No. 62/806,807, filed on Feb. 16, 2019, and also to International Patent Application No. PCT/US2019/029730, filed on Apr. 29, 2019, the contents of each of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing an array of light valves having a repeating plurality of color sub-pixels arranged in offset rows. Further, the backlighting includes a light control film (LCF), in various examples and embodiments. In particular, according to various embodiments consistent with the principles herein, a multiview display is provided. The multiview display comprises an array of light valves having a repeating plurality of color sub-pixels and arranged as a plurality of multiview pixels configured to modulate directional light beams as color pixels of views of a multiview image. A first row of the repeating plurality of the color sub-pixels is offset from or shifted with respect to a second row of the repeating plurality of color sub-pixels in the row direction. The offset or shift is configured to mitigate color fringing associated with multiview image. In addition, the multiview display further comprises a light control film (LCF) configured to control a view angle of the multiview image, according to various embodiments.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast and herein, a 'multiview display' is defined as an electronic display or display system configured to provide different views of a multiview image in or from different view directions. In particular, the different views may represent different perspective views of a scene or object of the multiview image. Uses of multiview backlighting and multiview displays applicable to the display of multiview images described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Figure 1A:
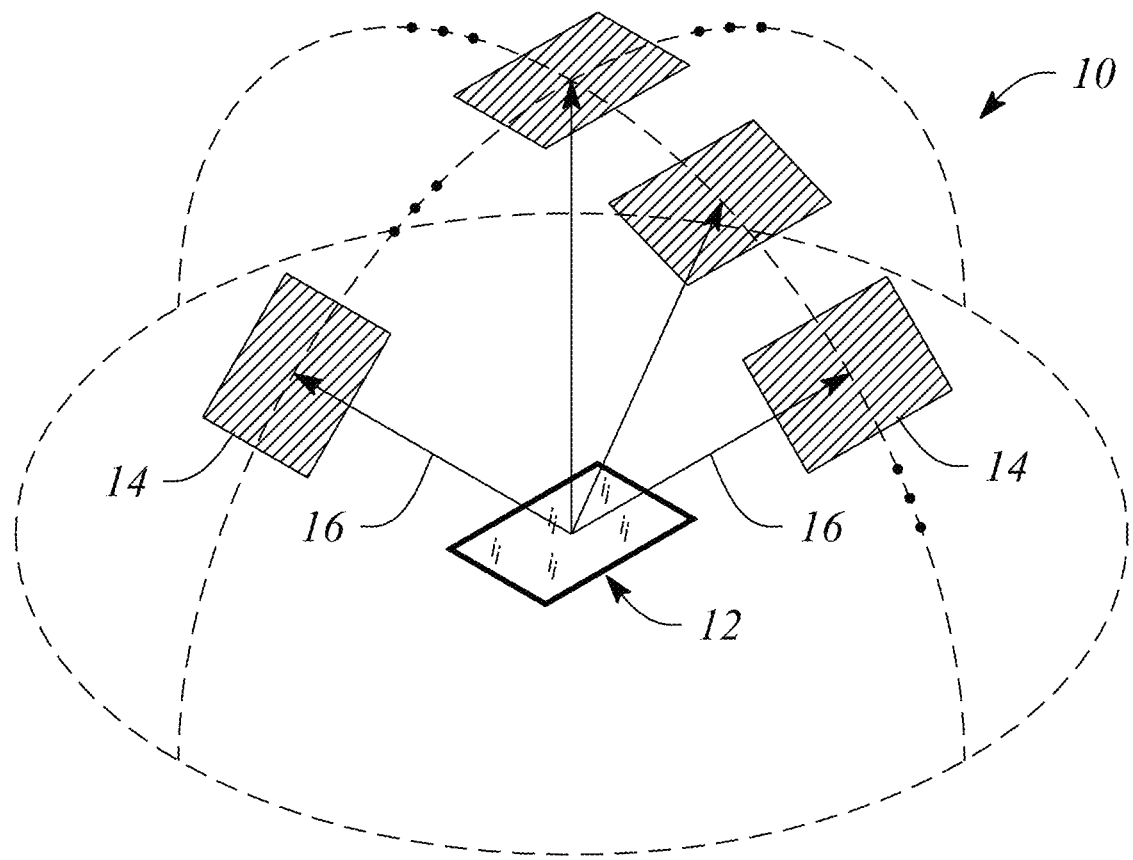
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen) while the azimuth angle $\varphi$ is an angle in a horizontal plane (e.g., parallel to the multiview display screen plane).

Figure 1B:
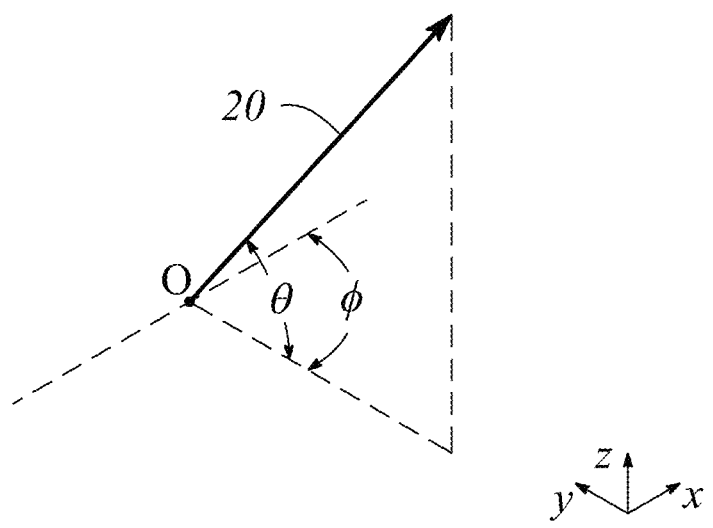
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each of a similar plurality of different views of a multiview display. In particular, a multiview pixel may have an individual pixel or set of pixels corresponding to or representing a view pixel in each of the different views of the multiview image. By definition herein therefore, a 'view pixel' is a pixel or set of pixels corresponding to a view in a multiview pixel of a multiview display. In some embodiments, a view pixel may include one or more color sub-pixels. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels a multiview pixel may have equivalent or at least substantially similar locations or coordinates in each of the different views. For example, a first multiview pixel may have individual view pixels located at $\{x1, y1\}$ in each of the different views of a multiview image, while a second multiview pixel may have individual view pixels located at $\{x2, y2\}$ in each of the different views, and so on.

In some embodiments, a number of view pixels in a multiview pixel may be equal to a number of views of the multiview display. For example, the multiview pixel may provide sixty-four (64) view pixels associated with a multiview display having 64 different views. In another example, the multiview display may provide an eight by four array of views (i.e., 32 views) and the multiview pixel may include thirty-two (32) view pixels (i.e., one for each view). Additionally, each different view pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of view pixels (i.e., pixels that make up a selected view) in the multiview display views each view of the multiview display. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

By definition herein, a 'multibeam emitter' is a structure or element of a backlight or a display that produces light that includes a plurality of light beams. In some embodiments, the multibeam emitter may be optically coupled to a light guide of a backlight to provide the light beams by coupling out a portion of light guided in the light guide. In such embodiments, a multibeam emitter may comprise a 'multibeam element.' In other embodiments, the multibeam emitter may generate light emitted as the light beams (i.e., may comprise a light source). Further, the light beams of the plurality of light beams produced by a multibeam emitter have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field. According to various embodiments, the different principal angular directions of the various light beams are determined by a characteristic including, but not limited to, a size (e.g., length, width, area, etc.) of the multibeam emitter. In some embodiments, the multibeam emitter may be considered an 'extended point light source', i.e., a plurality of point light sources distributed across an extent of the multibeam emitter, by definition herein. Further, a light beam produced by the multibeam emitter has a principal angular direction given by angular components $\{\theta, \varphi\}$, by definition herein, and as described above with respect to FIG. 1B.

Herein, a 'multibeam column' is defined as an elongated structure comprising a plurality of multibeam elements arranged in a line or column. In particular, the multibeam column is made up of multibeam elements of the multibeam element plurality arranged in a line or column. Further, the multibeam column is configured to provide or emit light that includes a plurality of directional light beams, by definition. As such, the multibeam column may be functionally similar to the multibeam element with regard to its light scattering properties. That is, the directional light beams of the plurality of directional light beams produced by a multibeam element of the multibeam column have different principal angular directions from one another, by definition herein. In some embodiments, the multibeam column may be a narrow elongated structure that substantially extends across a width of a backlight or similar component of a multiview display. In particular, the multibeam column may be made up of a plurality of discrete multibeam elements arranged in a line that extends across the backlight width, for example. An exception to the definition above is that, the multibeam column comprises a single, continuous diffraction grating structure instead of individual discrete multibeam elements, in some embodiments. In the exception, a section of the continuous diffraction grating effectively functions in a manner that is substantially similar to the discrete multibeam element of the multibeam column described above.

According to various embodiments, a width of the multibeam column may be defined by a size of a multibeam element of the multibeam element plurality of the multibeam column. Thus, the width of the multibeam column may be comparable to a width of a light valve used in a multiview display that is associated with the multibeam column. Further, the multibeam column width may be between about one half and about two times the light valve size, in some embodiments.

Herein, an 'active emitter' or equivalently an 'active optical emitter' is defined as an optical emitter configured to produce or emit light when activated or turned on. An active emitter does not receive light from another source of light. Instead, the active emitter generates its own light when activated. An active emitter may comprise a light emitting diode (LED), a micro light emitting diode (μLED), or an organic light emitting diode (OLED), in some examples. The light produced by the active emitter may have a color (i.e., may include a particular wavelength of light), or may be a range of wavelengths (e.g., white light). By definition herein, a 'color emitter' is an active emitter that provides light having a color. In some embodiments, an active emitter may comprise a plurality of optical emitters. In some embodiments, at least one optical emitter in the active optical emitter may generate light having a color, or equivalently a wavelength, that differs from a color or wavelength of light produced by at least one other optical emitter of the plurality.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., $>\pm 20°$). In other embodiments, the broad-angle emitted light cone angle may be greater than about thirty degrees (e.g., $>\pm 30°$), or greater than about forty degrees (e.g., $>\pm 40°$), or greater than about fifty degrees (e.g., $>\pm 50°$). For example, the cone angle of the broad-angle emitted light may be greater than about sixty degrees (e.g., $>\pm 60°$).

In some embodiments, the broad-angle emitted light cone angle may be defined to be about the same as a viewing angle of an LCD computer monitor, an LCD tablet, an LCD television, or a similar digital display device meant for broad-angle viewing (e.g., about $\pm 40\text{-}65°$). In other embodiments, broad-angle emitted light may also be characterized or described as diffuse light, substantially diffuse light, non-directional light (i.e., lacking any specific or defined directionality), or as light having a single or substantially uniform direction.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a color sub-pixel' means one or more color sub-pixels and as such, 'the color sub-pixel' means 'color sub-pixel(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2:
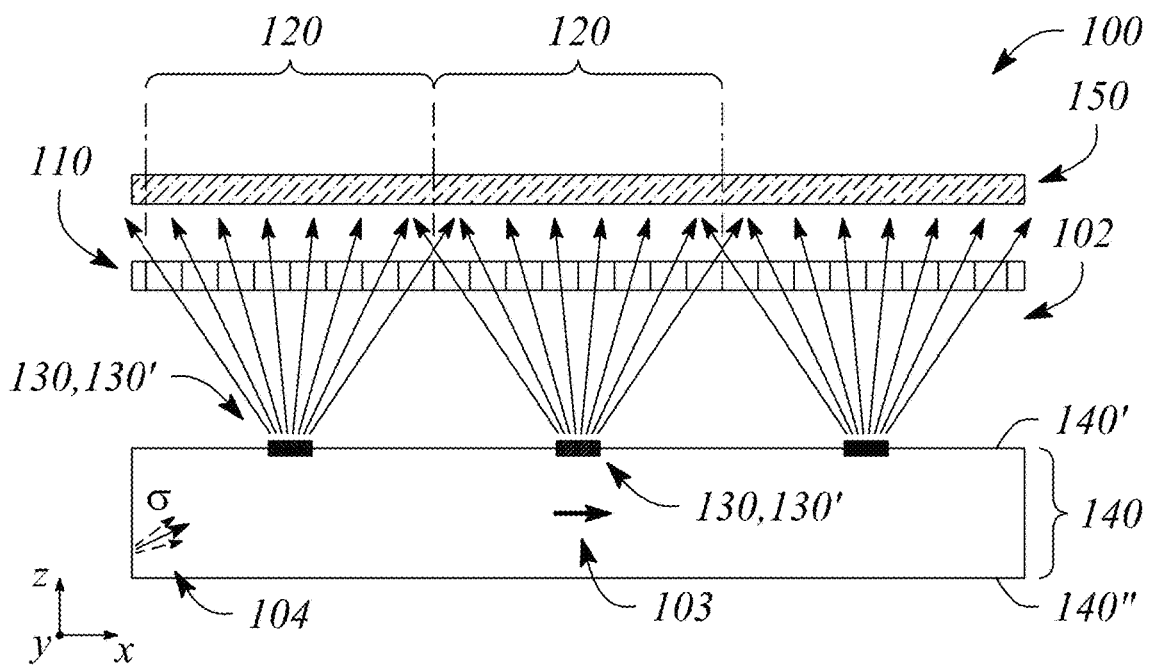
FIG. 2 illustrates a cross-sectional view of a multiview display in an example, according an embodiment consistent with the principles described herein.

According to some embodiments of the principles described herein, a multiview display is provided. FIG. 2 illustrates a cross-sectional view of a multiview display 100 in an example, according to an embodiment consistent with the principles described herein.

The multiview display 100 comprises an array of light valves 110. In various embodiments, different types of light valves may be employed as the light valves 110 of the light valve array including, but not limited to, one or more of liquid crystal light valves, electrophoretic light valves, and light valves based on electrowetting. The array of light valves 110 comprises a repeating plurality of color sub-pixels 112 configured to modulate directional light beams as color pixels of views of a multiview image.

Figure 3:
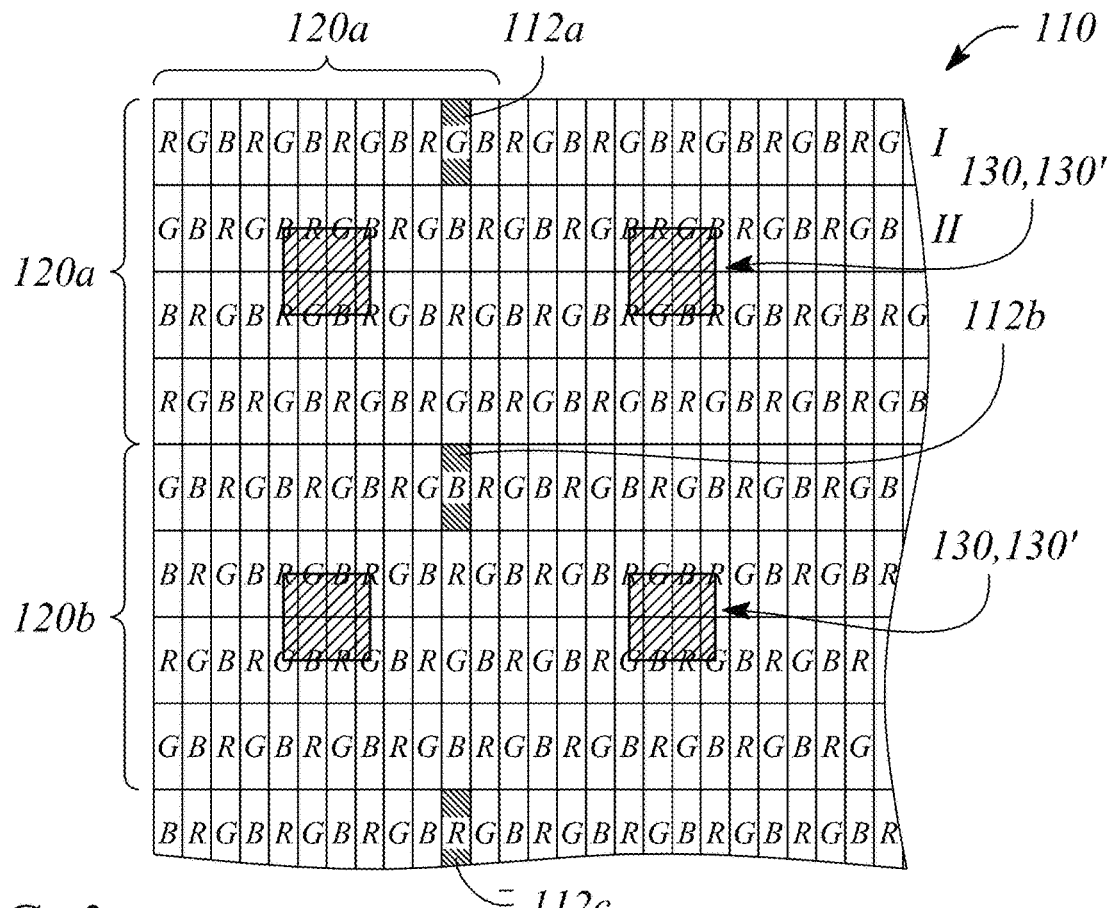
FIG. 3 illustrates a detailed view of a portion of an array of light valves of a multiview display in an example, according to an embodiment consistent with the principles described herein.

FIG. 3 illustrates a detailed view of a portion of an array of light valves 110 of a multiview display 100 in an example, according to an embodiment consistent with the principles described herein. The array of light valves 110 comprises a repeating plurality of color sub-pixels 112. In some embodiments, each color sub-pixel 112 of the repeating plurality of color sub-pixels has a different color. In the embodiment illustrated, the repeating plurality of color sub-pixels 112 consists of a repeating set of red, blue, and green color sub-pixels (RGB) in this order along a row of the array of light valves 110 (each color of a color sub-pixel of the repeating plurality of color sub-pixels is denoted with a corresponding initial in the figure). In other embodiments, the repeating plurality of color sub-pixels 112 may comprise a repeating set of red, blue, green, and yellow color sub-pixels (RGBY). In yet another embodiment, the repeating set may include red, blue, green, and white pixels (RGBW).

As illustrated on FIG. 3, the repeating plurality of color sub-pixels is arranged as a plurality of multiview pixels 120 of the multiview display 100. Each multiview pixel 120 of the plurality of multiview pixels comprises a different subset of the repeating plurality of color sub-pixels 112. Each multiview pixel 120 is configured to modulate directional light beams as color pixels of views of the multiview display 100. The modulated light beams represent the respective different colors of the color sub-pixels 112 of the plurality within the color pixels of the multiview display 100. In the embodiment illustrated, the multiview display 100 is a 4×4 display (i.e., offers 16 views in full parallax mode). Accordingly, each multiview pixel 120 of the plurality provides sixteen color view pixels corresponding to sixteen color pixels of sixteen different views of the multiview image. Each color view pixel comprises a set of three consecutive color sub-pixels 112 including a red color sub-pixel 112, a green color sub-pixel 112, and a blue color sub-pixel 112. The plurality of multiview pixels 120 may be arranged in rows and columns of multiview pixels 120.

A first row of the repeating plurality of color sub-pixels 112 is offset from or shifted with respect to a second row of the repeating plurality of color sub-pixels 112. FIG. 3 illustrates a first row I of the repeating plurality of color sub-pixels 112 being offset from a second row II of the repeating plurality of color sub-pixels 112. The first row I and the second row II are offset in the row direction, such that within a column of the color sub-pixels 112, a color sub-pixel 112 of the first row I has a different color from a color sub-pixel 112 of the second row II. In the embodiment illustrated, the first row I and the second row II are adjacent. Further, the offset (or equivalently, the offset distance) between the first row I and the second row II of the repeating plurality of color sub-pixels 112 is equal to an integer multiple of a width of a color sub-pixel 112. In the embodiment illustrated in FIG. 3, the first row I of the repeating plurality of color sub-pixels 112 is offset or shifted from the second row II of the repeating plurality of color sub-pixels 112 by a distance of one width of a color sub-pixel 112 in the direction of the repeating plurality of color sub-pixels 112. In other embodiments, the offset distance or shift distance between the first row I and the second row II may amount to two widths of a color sub-pixel 112, for example.

The offset or shift between the first row I and the second row II is configured to provide corresponding color sub-pixels 112 in adjacent multiview pixels 120 with or having different colors. FIG. 3 illustrates the corresponding color sub-pixels 112 in a set of adjacent multiview pixels 120a, 120b having different colors as a result of the offset between the first row I and the second row II of the repeating plurality of color sub-pixels 112. For example, a first color sub-pixel 112a of the illustrated multiview pixel 120a may have a green color, which differs from a blue color of a corresponding color sub-pixel 112b of an adjacent multiview pixels 120b due to the offset. Similarly, the offset results in corresponding color sub-pixels 112b, 112c having different colors, i.e., blue and red, respectively. The different colors of the corresponding colors sub-pixels 112, provided by the offset of rows in adjacent multiview pixels may serve to mitigate color fringing associated with the color pixel of the multiview display 100, according to some embodiments.

In some embodiments (e.g., as illustrated in FIGS. 2 and 3), the multiview display 100 may further comprises an array of multibeam emitters 130. The multibeam emitters 130 are configured to provide the directional light beams modulated by the plurality of color sub-pixels 112. The directional light beams may have principal angular directions corresponding to respective different view directions of the multiview display 100. In particular, FIG. 2 illustrates the directional light beams 102 as a plurality of diverging arrows depicted as being directed away from the multibeam emitters 130 of the multibeam emitter array.

In some embodiments, the multibeam emitters 130 of the array may be located at or adjacent to a first (top) surface of a substrate that supports the multibeam emitters 130 or equivalently a 'multibeam backlight,' as illustrated in FIG. 2. In other embodiments (not illustrated), the plurality of multibeam emitters 130 may be located on a second (or bottom) surface of the multibeam backlight, opposite to the first surface. In yet other embodiments (not illustrated), the multibeam emitters 130 of the multibeam emitter array may be located inside the multibeam backlight between the first surface and the second surface.

In some embodiments, a size of the multibeam emitter 130 is comparable to a size of a light valve 110 of the multiview display 100. Herein, the 'size' may be defined in any of a variety of manners to include, but not be limited to, a length, a width or an area. For example, the size of a light valve 110 may be a length thereof and the comparable size of the multibeam emitter 130 may also be a length of the multibeam emitter 130. In another example, size may refer to an area such that an area of the multibeam emitter 130 may be comparable to an area of the light valve 110. In some embodiments, the size of the multibeam emitter is comparable to the light valve size such that the multibeam emitter size is between about fifty percent (50%) and about two hundred percent (200%) of the light valve size.

As illustrated in FIGS. 2 and 3, different subsets of color sub-pixels 112 of the repeating plurality of color sub-pixels 112 of the array of light valves 110 correspond to different multibeam emitter 130 of the multibeam emitter array. Further, each of the different subsets of color sub-pixels 112 may represent a multiview pixel 120 of the multiview display 100, as illustrated. As such, a relationship between the multibeam emitters 130 of the multibeam emitter array and corresponding multiview pixels 120 (e.g., sets of light valves 110) may be a one-to-one relationship, in some embodiments. That is, there may be an equal number of multiview pixels 120 and multibeam emitters 130. FIGS. 2 and 3 illustrate by way of example and not limitation a one-to-one relationship where each multiview pixel 120 comprising a different set of light valves 110 is illustrated as surrounded by a thicker line.

Figure 4:
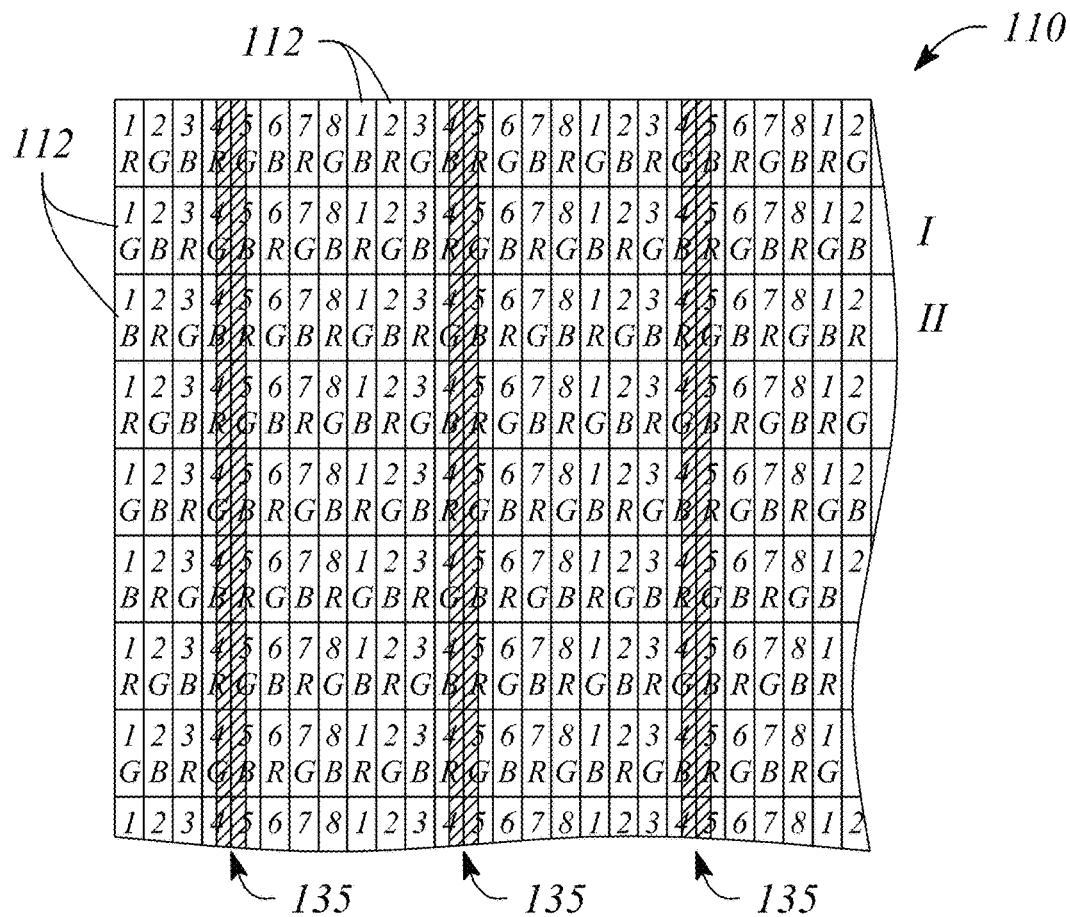
FIG. 4 illustrates a detailed view of a portion of an array of light valves of a multiview display in an example, according to an embodiment consistent with the principles described herein.

FIG. 4 illustrates a plan view of another multiview display 100 in an example, according to an embodiment consistent with the principles described herein. The multiview display 100 illustrated may represent a horizontal parallax multiview display. For example, as illustrated multiview display 100 may be an 8×1 horizontal parallax multiview display. In the illustrated embodiment, the multiview display 100 as a horizontal parallax multiview display comprises a plurality of multibeam columns 135 spaced apart along a length of the multiview display 100. A multibeam column 135 of the plurality of multibeam columns is configured to provide the directional light beams in a horizontal-only directional pattern. The directional light beams provided by the plurality of multibeam columns 135 are modulated by array of light valves 110 having offset rows of the repeating plurality of color sub-pixels 112, e.g., as described above. The directional light beams may have principal angular directions corresponding to respective different view directions of the multiview display 100, views corresponding to the different view directions being arranged in a horizontal-only arrangement corresponding to the horizontal-only directional pattern.

In FIG. 4, a first row I of the repeating plurality of color sub-pixels 112 of the multiview display 100 is offset or shifted from a second row II of the repeating plurality of color sub-pixels 112. Further, the first row I and the second row II are offset in the row direction, such that within a column of the color sub-pixels 112, a color sub-pixel 112 of the first row I has a different color from a color sub-pixel 112 of the second row H. According to various embodiments, an offset distance or shift distance between rows may be equal to an integer multiple of a width of a color sub-pixel 112, e.g., a width of a single color sub-pixel 112. The offset distance may result in the color sub-pixels 112 of the repeating plurality of color sub-pixels 112 to be arranged in parallel slanted vertical stripes for each color of the plurality. Color sub-pixels 112 are labeled according to colors R, G, B, corresponding to an RGB color model, while color sub-pixels 112 corresponding to the eight views are numbered (i.e., 1, 2, 3, 4, 5, 6, 7, 8) in FIG. 4.

As with the embodiments of FIGS. 2 and 3, this arrangement of color sub-pixels 112 as slanted vertical stripes illustrated in FIG. 4 may serve to mitigate color fringing associated with the color pixel of the multiview display 100, in some embodiments. Further, the slanted stripes arrangement of color sub-pixels 112 may prevent a view shift in the horizontal direction when the head of the viewer moves in the vertical direction or along the multibeam columns.

In some embodiments, the plurality of multibeam columns 135 is the array of multibeam emitters 130. That is, a multibeam column 135 of the multibeam column plurality may comprise a plurality of multibeam emitters 130 of the array of multibeam emitters arranged in a column. Further, the multibeam emitters 130 of each multibeam column 135 may be separated by a distance that is less than a width of a size of a multibeam emitter 130, in some embodiments. In some embodiments, multibeam emitters 130 of a multibeam column 135 may be separated by a distance comparable to a distance separating adjacent light valves 110 of the array of light valves. In some embodiments, the multibeam column 135 may comprise a continuous multibeam emitter 130 or a single elongated multibeam emitter 130.

Referring back to FIG. 2, in some embodiments, the multiview display 100 further comprises a light guide 140. The light guide 140 is configured to guide light along a length of the light guide as guided light 104 (i.e., a guided light beam 104). For example, the light guide 140 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 140, for example.

The light guide 140 may be a slab or plate of an optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 140 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 140 may further include a cladding layer (not illustrated) on at least a portion of a surface (e.g., one or both of the first surface and the second surface) of the light guide 140. The cladding layer may be used to further facilitate total internal reflection, according to some examples.

According to various embodiments, the light guide 140 is configured to guide the guided light 104 according to total internal reflection at a non-zero propagation angle between a first surface 140' (e.g., front or top surface or side) and a second surface 140" (e.g., back or bottom surface or side) of the light guide 140. In particular, the guided light 104 propagates by reflecting or 'bouncing' between the first surface 140' and the second surface 140" of the light guide 140 at the non-zero propagation angle. In some embodiments, a plurality of guided light beams 104 comprising different colors of light may be guided by the light guide 140 at respective ones of different color-specific, non-zero propagation angles. Note, the non-zero propagation angle is not illustrated in FIG. 2 for simplicity of illustration. However, a bold arrow depicting a propagation direction 103 illustrates a general propagation direction of the guided light 104 along the light guide length in FIG. 2.

According to some embodiments, the multibeam emitter 130 may comprise a multibeam element 130'. In particular, the multiview display 100 that includes the light guide 140 may further comprise an array of multibeam elements 130' corresponding to the array of multibeam emitters 130. As such, the multibeam element array is the multibeam emitter array, each multibeam element 130' of the multibeam element array may correspond to a different multibeam emitter 130 of the multibeam emitter array, in some embodiments. According to various embodiments, the multibeam elements 130' of the array are spaced apart from one another along a length of the light guide 140. The multibeam elements 130' of the array may be located at or adjacent to the first (or 'top') surface 140' of the light guide 140, for example as illustrated in FIG. 2. In other embodiments, the multibeam elements 130' of the array may be located on the second (or 'bottom') surface 140" of the light guide 140 or inside the light guide 140 between the first and second surfaces 140', 140".

According to various embodiments, the multibeam element 130' of the multibeam element array is configured to scatter out light from the light guide 140 as the plurality of directional light beams having principal angular directions corresponding to view directions of different views the multiview image or equivalently of the multiview display 100. According to various embodiments, the multibeam element 130' may comprise any of a number of different structures configured to scatter out a portion of the guided light 104 as directional light beams. For example, the different structures may include, but are not limited to, diffraction gratings, micro-reflective elements, micro-refractive elements, or various combinations thereof. In some embodiments, the multibeam element 130' comprising a diffraction grating is configured to diffractively scatter out the guided light portion as the plurality of directional light beams having the different principal angular directions. In other embodiments, the multibeam element 130' comprising a micro-reflective element is configured to reflectively scatter out the guided light portion as the plurality of directional light beams, or the multibeam element 130' comprising a micro-refractive element is configured to scatter out the guided light portion as the plurality of directional light beams by or using refraction (i.e., refractively scatter out the guided light portion).

In other embodiments (not illustrated), the multibeam emitters 130 may comprise an active optical emitter such as, but not limited to, a light emitting diode (LED), a micro light emitting diode (μLED) and a micro organic light emitting diode (μOLED). In these embodiments, the light guide 140 and a light source configured to provide light to be guided as the guided light within the light guide 140 may be omitted. Instead, the light guide 140 may be replaced by a substrate to support and provide power to the multibeam emitters 130, as mentioned above.

Referring again to FIG. 2, the multiview display 100 further comprises a light control film 150. According to various embodiments, the light control film 150 is configured to control a view angle of the multiview image. In some embodiments, the light control film 150 is configured to control a view angle of the multiview image in a direction orthogonal to a horizontal direction of the multiview display 100. In particular, a light control axis of the light control film 150 may be aligned with or parallel to columns of multibeam emitters 130 (e.g., parallel to multibeam columns 135 or columns of multibeam elements 130'). In these embodiments, the light control film 150 may have little or no effect on the view angle of the multiview image in a direction corresponding to the horizontal direction.

Figure 5A:
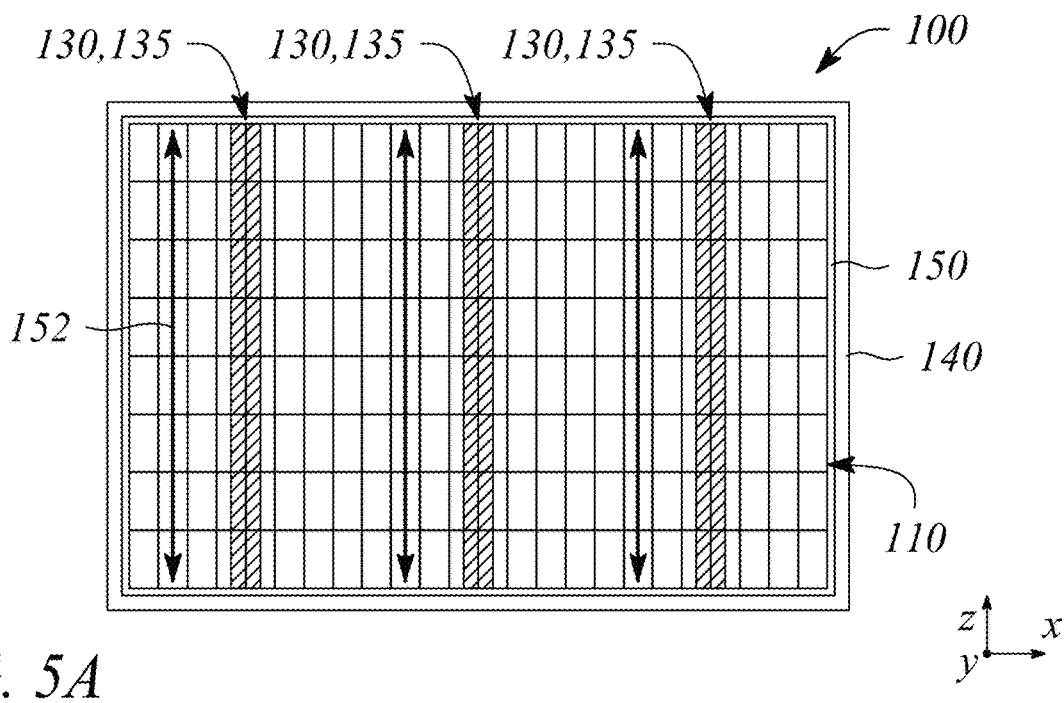
FIG. 5A illustrates a plan view of a multiview display having a light control film in an example, according to another embodiment consistent with the principle described herein.

FIG. 5A illustrates a plan view of a multiview display 100 having a light control film 150 in an example, according to an embodiment consistent with the principle described herein. As illustrated, the light control axis 152 of the light control film 150 is aligned with (i.e., substantially parallel to) the multibeam columns 135 comprising the multibeam emitters 130, by way of example and not limitation. As illustrated, the light control axis 152 is also parallel to or aligned with columns of light valves 110 (e.g., columns of color sub-pixels) of the array of light valves 110. In some embodiments, the light control film 150 may be located between the array of light valves 110 and a surface (e.g., the first surface 140') of the light guide 140, e.g., as illustrated in FIG. 5A. In other embodiments, the array of light valves 110 may be located between the light guide 140 and the light control film 150, e.g., as illustrated in FIG. 2, by way of example and not limitation.

Figure 5B:
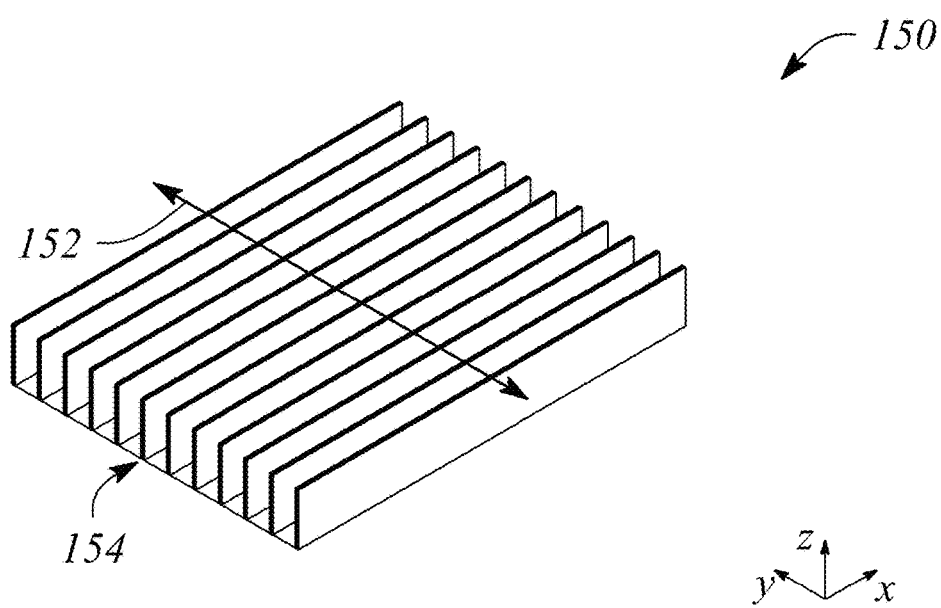
FIG. 5B illustrates a perspective view of a light control film in an example, according to another embodiment consistent with the principle described herein.

According to various embodiments, the light control film 150 may comprise any of a variety of light control films, privacy filters, and similar privacy films. FIG. 5B illustrates a perspective view of a light control film 150 in an example, according to another embodiment consistent with the principle described herein. As illustrated, the light control film 150 comprises a plurality of parallel micro-louvers or micro-baffles 154 which are configured to be opaque to light passing through the light control film 150. In between the parallel micro-baffles 154, the light control film 150 is substantially transparent to light. The parallel micro-baffles 154 provide a maximum amount of angular control in a direction perpendicular a length direction of the parallel micro-baffles 154. As such and by definition, the light control axis 152 is perpendicular to the length direction of the parallel micro-baffles 154, as illustrated. Examples of light control films that may be used as the light control film 150 include, but are not limited, various view control films (VC-films) manufactured by Shin-Etsu Polymers Europe B.V. that comprise an optical louver film of alternating optical clear silicon rubber and black silicon rubber layer, e.g., see www.shinetsu.info/vc_film. In another non-limiting example, the light control film 150 may comprise an advanced light control film (e.g., ALCF-P or ALCF-A) manufactured by 3M Display Materials & Systems Division, St. Paul, MN.

Figure 5C:
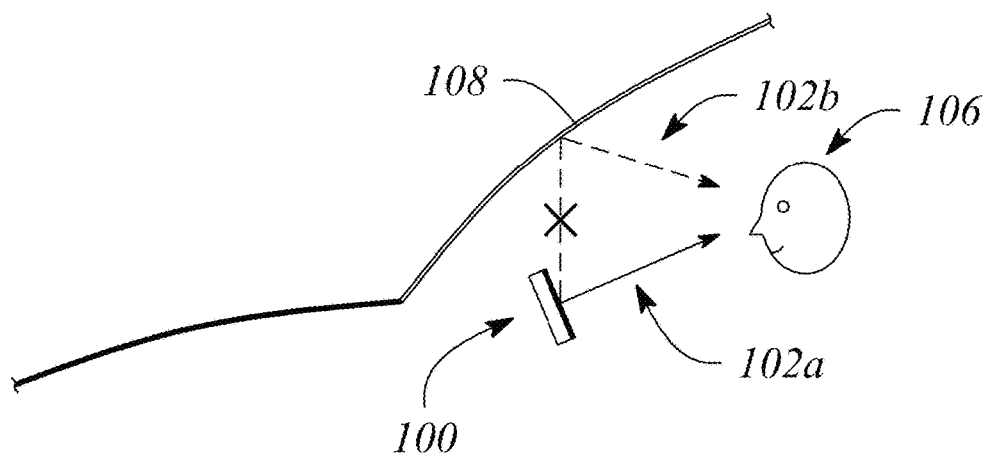
FIG. 5C illustrates a side view of a multiview display having a light control film in an example, according to another embodiment consistent with the principle described herein.

According to various embodiments, the light control film 150 may be configured minimize or limit an angular visibility or view angle of the multiview image in a direction of the light control axis 152. As such, multiview display 100 having the light control film 150 may be employed in situations where reflection may pose a problem. FIG. 5C illustrates a side view of a multiview display 100 having a light control film 150 in an example, according to another embodiment consistent with the principle described herein. As illustrated, the multiview display 100 is mounted in an instrument panel of an automobile. A driver 106 may readily view the multiview image in a direction 102a toward the multiview display 100 (e.g., a plane of horizontal parallax when the multiview display 100 is configured as a horizontal parallax-only display). On the other hand, the light control film 150 may essentially block a view of the multiview display 100 that reflects off of a windshield 108 of the automobile, as illustrated by view direction 102b.

Figure 6:
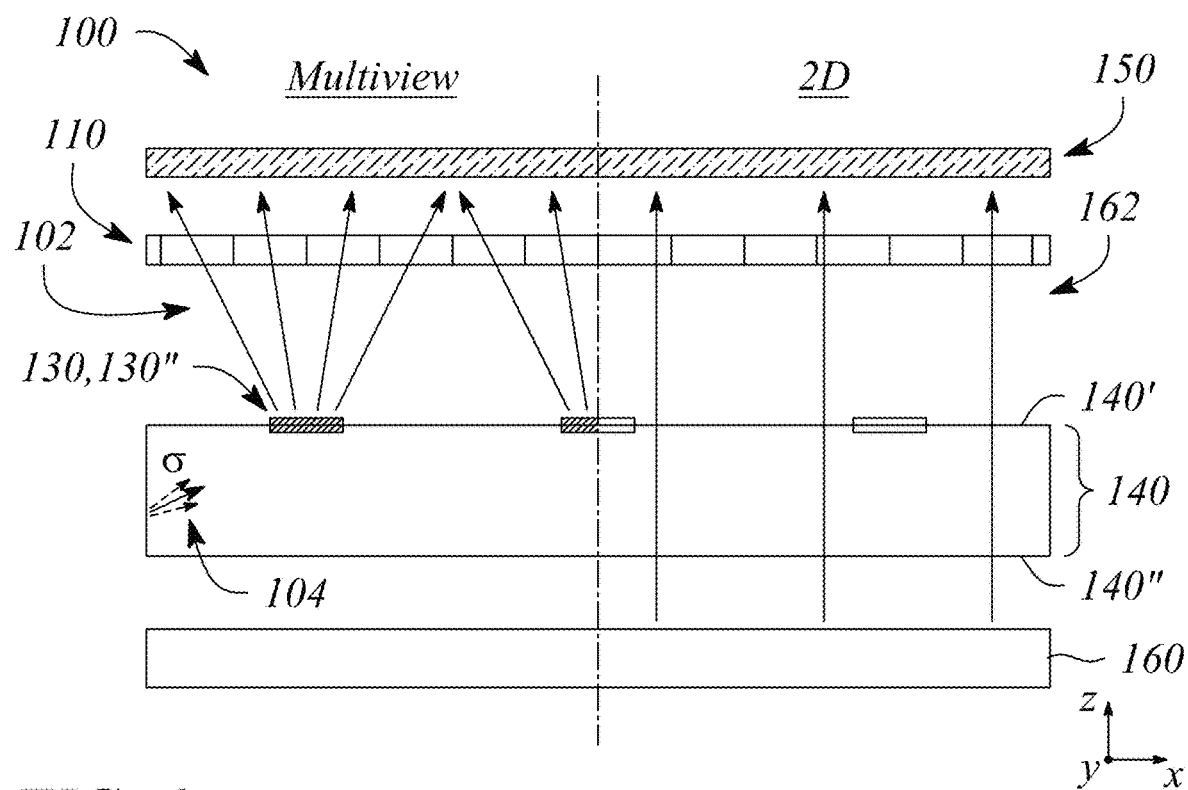
FIG. 6 illustrates a cross-sectional view of a multiview display comprising a broad-angle backlight in an example, according to an embodiment of the principles described herein.

In some embodiments, the multiview display 100 further comprises a broad-angle backlight 160 adjacent to the light guide 140. FIG. 6 illustrates a cross-sectional view of a multiview display 100 comprising a broad-angle backlight 160 in an example, according to an embodiment of the principles described herein. According to various embodiments, the broad-angle backlight 160 is opposite to a side of the light guide 140 adjacent to the light valve array. In particular, as illustrated, the broad-angle backlight 160 is adjacent to a bottom surface (i.e., the second surface 140") of the light guide 140. The broad-angle backlight 160 is configured to provide broad-angle light 162 as broad-angle emitted light. Also illustrated in FIG. 6 are the array of light valves 110 and the light control film 150.

According to some embodiments, the light guide 140 and the array of multibeam emitters or elements 130, 130' may be configured to be optically transparent to light propagating substantially perpendicular to a surface of the light guide 140 (e.g., the first and second surfaces 140', 140") to facilitate passage of the light through a thickness of the light guide 140. In particular, as illustrated in FIG. 6, the light guide 140 and the array of multibeam emitters or elements 130, 130' may be configured to be optically transparent to the broad-angle light 162 emitted from the adjacent broad-angle backlight 160. Thus, broad-angle light 162 may be emitted from the broad-angle backlight 160 and through the thickness of light guide 140. Therefore, the broad-angle light 162 from the broad-angle backlight 160 may be received through the bottom or second surface 140" of the light guide 140, transmitted through a thickness of the light guide 140, and emitted from a top surface (i.e., the first surface 140') of the light guide 140 toward the array of light valves 110. Because the light guide 140 is optically transparent to the broad-angle light 162, the broad-angle light 162 is not substantially affected by the light guide 140.

According to various embodiments, the multiview display 100 illustrated in FIG. 6 may selectively operate in a two-dimensional (2D) mode or a multiview mode. In the 2D mode, the multiview display 100 is configured to emit the broad-angle light 162 provided by the broad-angle backlight 160. In the multiview mode, the multiview display 100 is configured to emit the directional light beams 102 provided by the light guide 140, as previously described. The combination of the light guide 140 and broad-angle backlight 160 may be used in dual (2D/3D) display, for example.

Figure 7:
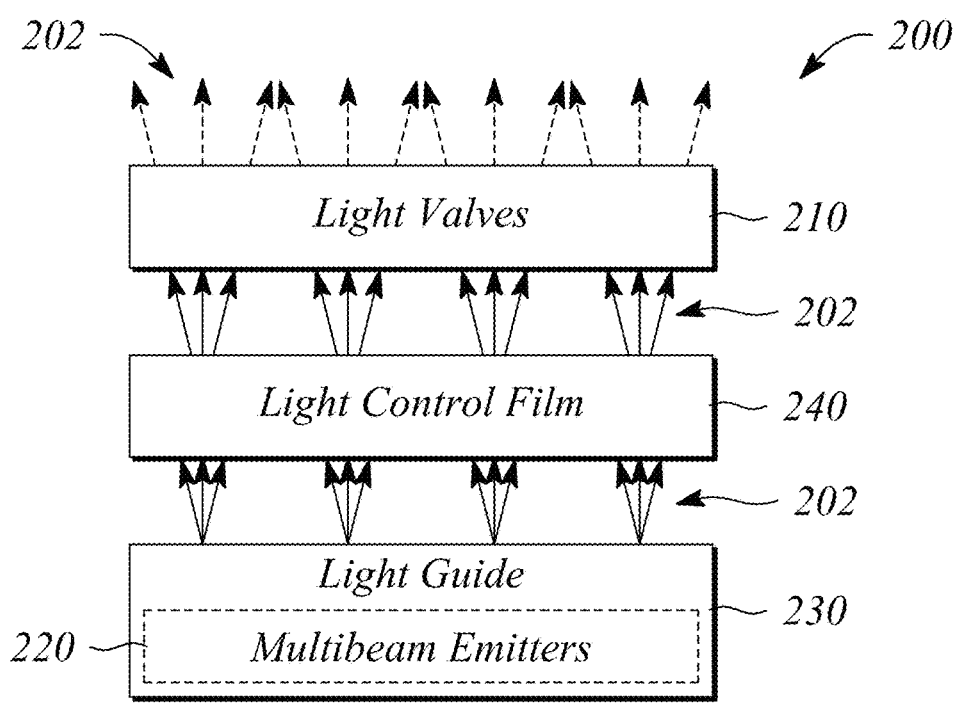
FIG. 7 illustrates a block diagram of a multiview display system in an example, according to an embodiment consistent with the principles herein.

In accordance with some embodiments of the principles described herein, a multiview display 200 is provided. FIG. 7 illustrates a block diagram of a multiview display 200 in an example, according to an embodiment consistent with the principles herein. The multiview display 200 comprises an array of light valves 210 having a repeating plurality of color sub-pixels arranged in offset rows. Light valves 210 of the light valve array are arranged as multiview pixels configured to modulate directional light beams as color pixels of a multiview image, according to various embodiments. In some embodiments, the light valves 210 of the array may be substantially similar to the light valves 110 of the multiview display 100, previously described. As such, different types of light valves may be employed as the light valves 110 of the light valve array including, but not limited to, one or more of liquid crystal light valves, electrophoretic light valves, and light valves based on electrowetting. In some embodiments, each color sub-pixel of the repeating plurality of color sub-pixels has a different color. For example, the repeating plurality of color sub-pixels may consist of a repeating set of red, blue, and green color sub-pixels (RGB) in this order along a row of the array of light valves 210. In other embodiments, the repeating plurality of color sub-pixels may comprise a repeating set of red, blue, green, and yellow color sub-pixels (RGBY). In yet another embodiment, the repeating set may include red, blue, green, and white pixels (RGBW).

The multiview display 200 further comprises an array of multibeam emitters 220 configured to illuminate different multiview pixels with different sets of directional light beams. In some embodiments, there may be a one-to-one relationship between a multibeam emitter 220 of the array of multibeam emitters 220 and a multiview pixel of the light valve array. The multibeam emitters 220 of the array may be substantially similar to the multibeam emitters 130 of the above-described multiview display 100, according to some embodiments. For example, the multibeam emitters 220 of the plurality are configured provide the directional light beams to be modulated by the array of light valves 210. According to various embodiments, the directional light beams have principal angular directions corresponding to respective different view directions of the multiview display 200. Further, the multibeam emitters 220 of the plurality may be located on a surface of or within a substrate used to support the multibeam emitters 220 (e.g., a light guide described below).

According to various embodiments, adjacent rows of the plurality of color sub-pixels are offset from one another by an integer multiple of a width of a color sub-pixel in or along a row direction. The offset or shift between the adjacent rows is configured to provide a color sub-pixel of a first multiview pixel having a different color than a corresponding color sub-pixel of a second multiview pixel, according to various embodiments. In some embodiments, the offset rows may be substantially similar to the rows having an offset between the first row of the array of color sub-pixels and the second row of the array of color sub-pixels, described above with respect to the multiview display 100. Further, according to the offset of adjacent offset rows of the plurality of color sub-pixels being an integer multiple of a width of a color sub-pixel, the adjacent rows may be offset or shifted by a distance of a width of a color sub-pixel (e.g., as illustrated in FIGS. 3 and 4 in reference to the multiview display 100) or two widths of a color sub-pixel, or three widths of a color sub-pixels, and so on.

In some embodiments, a multibeam emitter 220 of the multibeam emitter array comprises an active optical emitter. The active optical emitter is configured to emit light as the directional light beams. The directional light beams emitted by the active optical emitter have principal angular directions corresponding to the respective different view directions of the multiview display 200. The active optical emitter may comprise any number of different structures configured to emit light as a plurality of directional light beams. In some embodiments, the active optical emitter comprises, but is not limited to, a micro light emitting diode (μLED) or an organic light emitting diode (OLED). In some embodiments, the active optical emitter is configured to emit white light, while in other embodiments the active optical emitter may emit light comprising a particular color (e.g., may be a monochromatic active optical emitter).

Further, a size of the active optical emitter is comparable to a size of a light valve 210 of the light valve array. Herein, the 'size' may be defined in any of a variety of manners to include, but not be limited to, a length, a width or an area. For example, the size of a light valve 210 of the light valve array may be a length thereof and the comparable size of the active optical emitter may also be a length of the active optical emitter. In another example, size may refer to an area such that an area of the active optical emitter may be comparable to an area of the light valve 210 of the light valve array.

In other embodiments, the multibeam emitter 220 of the multibeam emitter array may be substantially passive. In particular, in some embodiments (e.g., as illustrated in FIG. 7), the multiview display 200 further comprises a light guide 230. The light guide 230 is configured to guide light in a propagation direction along a length of the light guide as guided light. In some embodiments, the light guide 230 may be substantially similar to the light guide 140 of the multiview display 100, previously described. According to various embodiments, the light guide 230 is configured to guide the guided light using total internal reflection. Further, the guided light may be guided at a non-zero propagation angle by or within the light guide 230. In some embodiments, the guided light may be collimated or may be a collimated light beam. In particular, the guided light may be collimated according to or having a collimation factor σ, in various embodiments.

In some embodiments (e.g., when the multibeam emitters 220 are passive), the multiview display 200 may further comprise an array of multibeam elements spaced apart from one another along the light guide length. The multibeam element is configured to scatter out a portion of the guided light within the light guide 230 as the directional light beams. Further, a multibeam element of the multibeam element array may correspond to a multibeam emitter of the multibeam emitter array, according to these embodiments. In some embodiments, a multibeam element of the array of multibeam elements may be substantially similar to the multibeam element 130' of the multiview display 100, described above. As such, the multibeam element is configured to illuminate different multiview pixels with different sets of the directional light beams. In particular, there may be a one-to-one relationship between a multibeam element of the array of multibeam elements and a multiview pixel of the array of multiview pixels. The multibeam element may be located on surface of or within the light guide 230.

In some embodiments, a size of the multibeam element is comparable to a size of a light valve 210 of the light valve array. In some embodiments, the size of the multibeam element is comparable to the light valve size such that the multibeam element size is between about fifty percent (50%) and about two hundred percent (200%) of the light valve size.

In some embodiments, the multibeam element may comprise any of a number of different structures configured to scatter out a portion of the guided light. For example, the different structures may include, but are not limited to, diffraction gratings, micro-reflective elements, micro-refractive elements, or various combinations thereof. In some embodiments, the multibeam element comprising a diffraction grating is configured to diffractively scatter out the guided light portion as the plurality of directional light beams having the different principal angular directions. In other embodiments, the multibeam element comprising a micro-reflective element is configured to reflectively scatter out the guided light portion as the plurality of directional light beams, or the multibeam element comprising a micro-refractive element is configured to scatter out the guided light portion as the plurality of directional light beams by or using refraction (i.e., refractively scatter out the guided light portion).

The multiview display 200 illustrated in FIG. 7 further comprises a light control film 240 configured to control a view angle of the multiview image. According to some embodiments, the light control film 240 may be substantially similar to the light control film 150 described above with respect to the multiview display 100. In particular, the light control film 240 has a light control axis aligned with a column of multibeam emitters 220, in some embodiments. That is, the light control axis of the light control film 240 may be parallel to the multibeam emitter columns of the multiview display 200. The light control axis may also be aligned with columns of light valves 210 in the light valve array. In some embodiments, the array of light valves 210 is between the light control film 240 and the light guide 230 having the multibeam emitters 222, as illustrated in FIG. 7. In other embodiments not explicitly illustrated with respect to the multiview display 200, the light control film 240 may be located between the array of light valves 210 and the light guide 230.

In some embodiments (not illustrated), the multiview display 200 may further comprise a light source. According to various embodiments, the light source is configured to provide the light to be guided within light guide 230. In particular, the light source may be located adjacent to an entrance surface or end (input end) of the light guide 230. In various embodiments, the light source may comprise substantially any source of light (e.g., optical emitter) including, but not limited to, one or more light emitting diodes (LEDs) or a laser (e.g., laser diode). In some embodiments, the light source may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source may be a substantially broadband light source configured to provide substantially broadband or polychromatic light. For example, the light source may provide white light. In some embodiments, the light source may comprise a plurality of different optical emitters configured to provide different colors of light. The different optical emitters may be configured to provide light having different, color-specific, non-zero propagation angles of the guided light corresponding to each of the different colors of light.

In some embodiments, the guided light may be collimated or equivalently may be a collimated light beam (e.g., provided by a collimator, as described below). Herein, a 'collimated light' or 'collimated light beam' is generally defined as a beam of light in which rays of the light beam are substantially confined to a predetermined or defined angular spread within the light beam (e.g., the guided light). Further, rays of light that diverge or are scattered from the collimated light beam are not considered to be part of the collimated light beam, by definition herein. Moreover, the guided light may be collimated according to or having a collimation factor σ, in various embodiments.

Figure 8:
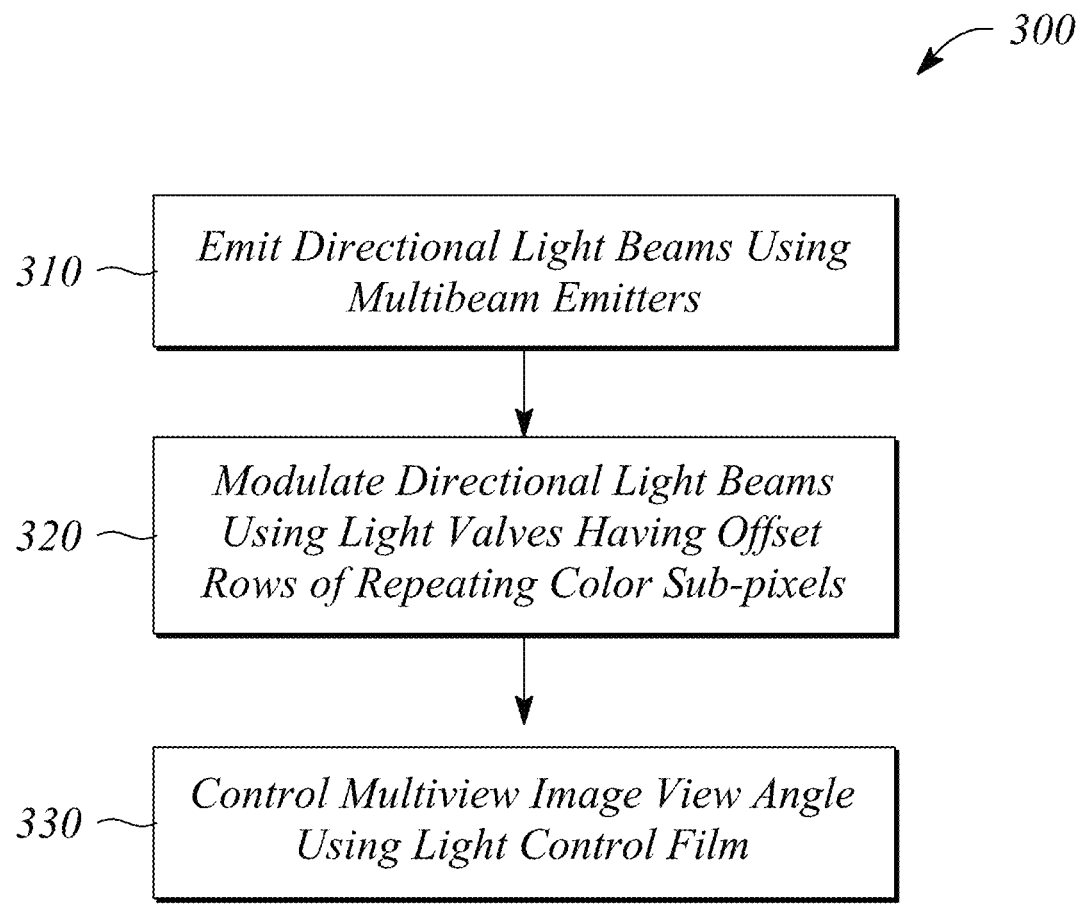
FIG. 8 illustrates a flowchart of a method of a multiview display system operation in an example, according to an embodiment consistent with the principles described herein.

According to some embodiments of the principles described herein, a method of multiview display operation is provided. FIG. 8 illustrates a flow chart of the method 300 of multiview display operation, according to an embodiment consistent with the principles described herein. As illustrated, the method 300 of multiview display operation comprises emitting 310 directional light beams using an array of multibeam emitters. In some embodiments, the multibeam emitters of the array may be substantially similar to the multibeam emitters 130 of the multiview display 100, previously described. In particular, the multibeam emitters of the multibeam emitter array may be arranged in rows and columns of multibeam emitters. The directional light beams have directions corresponding to different views directions of the multiview display.

The method 300 of multiview display operation further comprises modulating 320 the directional light beams using an array of light valves. The array of light valves comprises a repeating plurality of color sub-pixels arranged as a plurality of multiview pixels and the modulated directional light beams provide color pixels of different views of a multiview image displayed by the multiview display. According to some embodiments, the array of light valves may be substantially similar to the array of light valves 110 of the above-described multiview display 100. As such, different types of light valves may be employed as the light valves of the light valve array including, but not limited to, one or more of liquid crystal light valves, electrophoretic light valves, and light valves based on electrowetting.

In some embodiments, each color sub-pixel of the repeating plurality of color sub-pixels has a different color. For example, the repeating plurality of color sub-pixels may consist of a repeating set of red, blue, and green color sub-pixels (RGB) in this order along a row of the array of light valves, as illustrated in FIGS. 3 and 4 for the multiview display 100. In other embodiments, the repeating plurality of color sub-pixels may comprise a repeating set of red, blue, green, and yellow color sub-pixels (RGBY). In yet another embodiment, the repeating set may include red, blue, green, and white pixels (RGBW). The color sub-pixels of the repeating plurality of color sub-pixels are arranged along rows of the light valve array. Further, multibeam emitters of the multibeam emitter array are arranged in rows having a row direction corresponding to row direction of the rows of the light valve array.

According to various embodiments, rows of the repeating plurality of color sub-pixels of the light valve array are offset or shifted from one another. In particular, a first row of the repeating plurality of color sub-pixels is offset from a second row of the repeating plurality of color sub-pixels to provide corresponding color sub-pixels in adjacent multiview pixels with different colors. The offset of the rows is configured to mitigate color fringing associated with the color pixel of a multiview image being displayed by the multiview display. In some embodiments, the offset between the first and a second row may be substantially similar to the offset between the first and the second row as described in relation to the multiview display 100. For example, the offset or shift between the first and second rows of the repeating plurality of color sub-pixels may be equal to an integer multiple of a width of a color sub-pixel in a direction of the repeating plurality of color sub-pixels. In some embodiments, emitting 310 the directional light beams comprises using a plurality of multibeam columns spaced apart from one another along a length of the multiview display to emit the directional light beams. In particular, multibeam column of the multibeam column plurality is configured to emit a plurality of directional light beams. The directional light beams have principal directions corresponding to view directions of the multiview display. In some embodiments, the plurality of multibeam columns is the array of multibeam emitters. That is, a multibeam column of the multibeam column plurality comprises a column of multibeam emitters of the array of multibeam emitters wherein the multibeam emitters are offset from one another in a row direction to form a slanted column of multibeam emitters. In some embodiments, the multibeam column may comprise a continuous multibeam element or a single elongated multibeam element. The multibeam columns may be employed in a horizontal parallax-only display where the views are arranged in a horizontal parallax arrangement, as illustrated in FIG. 4 for a horizontal parallax-only arrangement of the multiview display 100.

In some embodiments, emitting 310 directional light beams using an array of multibeam emitters comprises guiding light in a light guide as guided light. The light guide may be substantially similar to the light guide 140 of the multiview display 100, and light may be guided at a non-zero propagation angle between opposite internal surfaces of the light guide, in some embodiments. Emitting 310 the directional light beams using the array of multibeam emitters may further comprise scattering out a portion of the guided light using a multibeam element of an array of multibeam elements to provide the directional light beams. The multibeam element may be substantially similar to the multibeam element 130' of the multiview display 100. Further, the multibeam element may have a size comparable to a size of a light valve of the light valve array. For example, the size of the multibeam element may be comparable to the light valve size such that the multibeam element size is between about fifty percent (50%) and about two hundred percent (200%) of the light valve size. Further, the multibeam element may be the multibeam emitter array such that each multibeam element of the multibeam element array corresponds to a different multibeam emitter of the multibeam emitter array.

As illustrated in FIG. 8, the method 300 of multiview display operation further comprises controlling 330 a view angle of the multiview image using a light control film. In some embodiments (e.g., when the multiview display is a horizontal parallax multiview display) the view angle may be controlled in a direction perpendicular to the horizontal parallax. According to some embodiments, the light control film may be substantially similar to the above-described light control film 150 of the multiview display 100. For example, the light control film may comprise micro-louvers and the light control axis may be defined as a direction perpendicular to a direction of the micro-louvers. In some embodiments, the light control film may be located between the array of light valves and a surface of the light guide, while the light valve array may be located between the light control film and the light guide surface, in other embodiments.

Thus, there have been described examples and embodiments of a multiview display and method having a light control film and comprising a repeating plurality of color sub-pixels arranged in rows and having an offset or shift configured to mitigate color fringing associated with the multiview image. It should be understood that the above-described examples are merely illustrative of some of the many specific examples that represent the principles described herein. Clearly, those skilled in the art can readily devise numerous other arrangements without departing from the scope as defined by the following claims.

What is claimed is:
1. A multiview display comprising:
an array of light valves having rows of a repeating plurality of color sub-pixels and arranged as a plurality of multiview pixels configured to modulate directional light beams as color pixels of views of a multiview image, a first row of the repeating plurality of color sub-pixels being offset from a second row of the repeating plurality of color sub-pixels in a row direction by an integer multiple of a width of a color sub-pixel;

a light control film configured to control a view angle of the multiview image; and a plurality of multibeam columns spaced apart from one another along a length of the multiview display, a multibeam column of the plurality of multibeam columns being configured to provide the directional light beams in a horizontal-only directional pattern, the multiview display being a horizontal parallax-only display, the light control film having a light control axis oriented orthogonal to the horizontal-only directional pattern of the directional light beams, wherein the offset of the first and second rows is configured to provide corresponding color sub-pixels in adjacent multiview pixels having different colors to mitigate color fringing associated with the color pixel of the multiview image.

2. The multiview display of claim 1, wherein each color sub-pixel of the repeating plurality of color sub-pixels has a different color, the modulated light beams representing the respective different colors within the color pixels of the multiview image.

3. The multiview display of claim 2, wherein the repeating plurality of color sub-pixels comprises a red color sub-pixel, a green color sub-pixel, and a blue color sub-pixel.

4. The multiview display of claim 1, wherein:

the plurality of multibeam columns includes a plurality of multibeam emitters that are spaced apart from one another, a multibeam emitter of the plurality of multibeam emitters having a size between one half and two times a size of a light valve of the light valve array; and a different subset of color sub-pixels of the repeating plurality of color sub-pixels of the array of light valves corresponds to each multibeam emitter of the multibeam emitter array, the different subset representing a multiview pixel of the plurality of multiview pixels of the multiview display.

5. The multiview display of claim 1, wherein the multibeam column comprises a continuous multibeam element.

6. The multiview display of claim 4, further comprising:

a light guide configured to guide light along a length of the light guide; and an array of multibeam elements spaced apart from one another along the light guide length, a multibeam element of the multibeam element array being configured to scatter out from the light guide a portion of the guided light as the directional light beams, wherein the multibeam element array is the multibeam emitter array, each multibeam element of the multibeam element array corresponding to a different multibeam emitter of the multibeam emitter array, and wherein the light control film is located between the light guide and the array of light valves and has a light control axis aligned with a column of multibeam elements of the multibeam element array.

7. The multiview display of claim 6, wherein the multibeam element comprises one or more of a diffraction grating configured to diffractively scatter out the portion of the guided light as the directional light beams, a micro-reflective structure configured to reflectively scatter out the portion of the guided light as the directional light beams, and a micro-refractive structure configured to refractively scatter out the portion of the guided light as the directional light beams.

8. The multiview display of claim 6, further comprising a broad-angle backlight adjacent to a side of the light guide opposite to a side adjacent to the light valve array, the broad-angle backlight being configured to provide broad-angle emitted light during a two-dimensional (2D) mode of the multiview display, the light valve array being configured to modulate the broad-angle emitted light as a 2D image, wherein the light guide and multibeam element array are configured to be transparent to the broad-angle emitted light, the multiview display being configured to display the multiview image during a multiview mode and the 2D image during the 2D mode.

9. The multiview display of claim 1, wherein the light control film has a light control axis aligned with a column of light valves of the light valve array.

10. A multiview display comprising:

an array light valves having a repeating plurality of color sub-pixels arranged in offset rows, light valves of the light valve array being arranged as multiview pixels configured to modulate directional light beams as color pixels of a multiview image;

an array of multibeam emitters configured to illuminate different multiview pixels with different sets of the directional light beams; and a light control film configured to control a view angle of the multiview image, a light control axis of the light control film being aligned with a column of multibeam emitters of the multibeam emitter array, wherein adjacent offset rows are offset from one another by an integer multiple of a width of a color sub-pixel, the offset between the adjacent rows being configured to provide a color sub-pixel of a first multiview pixel having a different color than a corresponding color sub-pixel of a second multiview pixel, and wherein a multibeam emitter of the multibeam emitter array comprises an active optical emitter configured to emit light as the directional light beams, the active optical emitter having a size between one half and two times a size of a light valve of the light valve array.

11. The multiview display of claim 10, wherein each color sub-pixel of the repeating plurality of color sub-pixels has a different color, the modulated light beams representing the respective different colors within the color pixels of the multiview image.

12. The multiview display of claim 10, further comprising:

a light guide configured to guide light in a propagation direction along a length of the light guide; and an array of multibeam elements spaced apart from one another along the light guide length, a multibeam element of the multibeam element array corresponding to a multibeam emitter of the multibeam emitter array and having a size between one half and two times a size of a light valve of the multiview pixel and being configured to scatter out from the light guide a portion of the guided light as the directional light beams, wherein light valve array is located between the light control film and the light guide.

13. The multiview display of claim 12, wherein the multibeam element comprises one or more of a diffraction grating, a micro-reflective element and a micro-refractive element optically connected to the light guide to scatter out the portion of the guided light.

14. The multiview display of claim 12, further comprising a light source optically coupled to an input of the light guide, the light source being configured to provide light to be guided in the light guide as guided light one or both of having a non-zero propagation angle and being collimated according to a predetermined collimation factor.

15. A method of multiview display operation comprising:
emitting directional light beams using an array of multibeam emitters;
modulating the directional light beams using an array of light valves having rows of a repeating plurality of color sub-pixels and arranged as a plurality of multiview pixels to provide a multiview image; and
controlling a view angle of the multiview image using a light control film having a light control axis aligned with a column of multibeam emitters of the multibeam emitter array,
wherein a first row of the repeating plurality of color sub-pixels is offset from a second row of the repeating plurality of color sub-pixels to provide corresponding color sub-pixels in adjacent multiview pixels with different colors to mitigate color fringing associated with the color pixel of the multiview image being displayed by the multiview display,
wherein emitting the directional light beams comprises using a plurality of multibeam columns spaced apart from one another along a length of the multiview display to emit the directional light beams, each multibeam column of the multibeam column plurality being configured to emit a plurality of directional light beams having directions corresponding to view directions of the multiview display,
wherein the plurality of multibeam columns is the array of multibeam emitters and the multiview display is a horizontal parallax-only display, the view directions being arranged in a horizontal parallax arrangement, and wherein the light control film has a light control axis oriented orthogonal to the horizontal parallax arrangement of the view directions.

16. The method of multiview display operation of claim 15, wherein each color sub-pixel of the repeating plurality of color sub-pixels has a different color, the modulated light beams representing the respective different colors within the color pixels of the multiview image, and wherein the second row is offset from the first row in a row direction by an integer multiple of a width of a color sub-pixel of the color sub-pixel plurality.

17. The method of multiview display operation of claim 15, wherein emitting the directional light beams using the array of multibeam emitters comprises:
guiding light in a light guide as guided light; and
scattering out a portion of the guided light using a multibeam element of an array of multibeam elements to provide the directional light beams, a size of the multibeam element being between one half and two times a size of a light valve of the light valve array,
wherein the multibeam element array is the multibeam emitter array, each multibeam element of the multibeam element array corresponding to a different multibeam emitter of the multibeam emitter array.

* * * * *